United States Patent [19]

Kanzaki et al.

[11] Patent Number: 5,652,764

[45] Date of Patent: Jul. 29, 1997

[54] RADIO COMMUNICATION SYSTEM

[75] Inventors: Kiyoko Kanzaki, Kamakura; Hidehiro Takahashi, Yokohama, both of Japan

[73] Assignee: Kabushiki Kaisha Toshiba, Kanagawa, Japan

[21] Appl. No.: 586,160

[22] Filed: Jan. 17, 1996

[30] Foreign Application Priority Data

Jan. 17, 1995 [JP] Japan ..................... 7-005274

[51] Int. Cl.⁶ ................. H04B 7/216; H04B 7/06
[52] U.S. Cl. ................. 375/200; 375/207; 375/299; 375/267; 370/209; 455/101
[58] Field of Search ................. 375/200, 207, 375/347, 343, 260, 267, 299; 370/18, 22, 19; 455/101, 102, 103

[56] References Cited

U.S. PATENT DOCUMENTS

| 4,081,748 | 3/1978 | Batz | 375/267 |
|---|---|---|---|
| 4,490,830 | 12/1984 | Kai et al. | 375/299 |
| 5,203,018 | 4/1993 | Hirose | 375/267 |
| 5,280,631 | 1/1994 | Nakahi et al. | 455/101 |
| 5,289,499 | 2/1994 | Weerackody | 370/18 |
| 5,305,353 | 4/1994 | Weerackody | 375/347 |
| 5,394,435 | 2/1995 | Weerackody | 370/18 |
| 5,457,712 | 10/1995 | Weerackody | 375/260 |

FOREIGN PATENT DOCUMENTS

9012463 10/1990 WIPO .................. 375/267

*Primary Examiner*—Stephen Chin
*Assistant Examiner*—T. Ghebretinsae
*Attorney, Agent, or Firm*—Banner & Witcoff, Ltd.

[57] ABSTRACT

Transmission data is spread by spreaders through two orthogonal codes generated by orthogonal code generators, the spread signals are subjected to binary phase modulation with a given carrier wave by BPSK modulators, and are then transmitted from separate antennas positioned in differing spatial locations. Thus, it is possible to provide a radio communication system capable of realizing transmission diversity even in the case of initial transmission where there is yet no information regarding the location, direction, etc., of a partner station, or where a base station is to transmit data directed to all of a plurality of mobile stations, such as in mobile communication systems.

17 Claims, 12 Drawing Sheets

FIG.4(a) TRANSMISSION DATA: 1 1 0 0 1 ...

FIG.4(b) ORTHOGONAL CODE 1: 1 1 1 1 0 0 0 0 1 1 1 1 0 0 0 0 1 1 1 1 0 0 0 0 1 1 1 1 0 0 0 0 ...

FIG.4(c) ORTHOGONAL CODE 2: 1 1 0 0 1 1 0 0 1 1 0 0 1 1 0 0 1 1 0 0 1 1 0 0 1 1 0 0 1 1 0 0 1 1 ...

FIG.4(d) TRANSMISSION CODE 1: 0 0 0 0 1 1 1 1 0 0 0 0 1 1 1 1 0 0 0 0 1 1 1 1 1 1 1 1 0 0 0 0 1 1 ...

FIG.4(e) TRANSMISSION CODE 2: 0 0 1 1 0 0 1 1 1 1 0 0 1 1 0 0 1 1 0 0 1 1 0 0 1 1 0 0 1 1 0 0 ...

RADIO COMMUNICATION SYSTEM

BACKGROUND OF THE INVENTION

1. Field of the Invention

The present invention relates to a radio communication system, and more particularly to a radio communication system intended to reduce transmission power by adopting a diversity method on the transmitting side.

2. Description of the Related Art

It is usually the case in radio communications that radio frequency signals transmitted between a given transmitting station and receiving station are sometimes propagated over different paths; this can produce the phenomenon called "fading", whereby individual component wave interference and the like produces fluctuations in received wave level. Diversity is a technique used to overcome the phenomenon of fading.

One common diversity technique that is widely used is reception diversity, whereby a plurality of antennas is provided on the receiving side for signal reception and the strongest signal is selected, or by addition, in some selected ratio, of signals received by a plurality of antennas in order to produce a strong signal.

Transmission diversity, whereby a plurality of antennas is provided on the transmitting side, is also used in some cases. In such cases, it is necessary to decide, for the plurality of antennas, the ratio at which transmission will take place from each antenna, with reference to the conditions of wave propagation between the transmitting station and the receiving station which are to communicate.

In TDD (time division duplex) communication, whereby transmission and reception are conducted by time-division multiplex communication at the same given frequency, one method for achieving transmission diversity involves receiving radio signals with a plurality of antennas, determining the antennas with high reception levels, and using these antennas for transmission.

This method can be used only when the communication partner has been determined. That is, when bidirectional communication is conducted by TDD communication between designated radio stations, it is possible to select the antenna for transmission on the basis of received signal level data.

In the case of initial transmission, where there is yet no information regarding the location, direction, etc., of the partner station, or when communication is to take place with all of a plurality of stations within the base station area, such as in mobile communication systems, and in similar cases, it is impossible to determine which of the plurality of antennas should be used for transmission, making transmission diversity impossible.

In such cases in the past, the only way to conduct communication with a quality equivalent to that when communication by TDD has been established and transmission diversity by TDD is employed was to increase transmission output.

However, increasing transmission output has cost disadvantages and the additional drawback that interference with other communication systems increases.

SUMMARY OF THE INVENTION

As noted above, in conventional radio communications, transmission diversity is impossible in initial-stage communication or in the case of transmission to numerous unspecified stations, thus making it necessary to increase transmission output. This has disadvantages in terms of cost and increased interference with other communication systems.

An object of the present invention is to provide a radio communication system that makes transmission diversity possible, even in the case of initial transmission where there is yet no information regarding the location, direction, etc., of the partner station, or where a base station is to transmit data directed to all of a plurality of mobile stations, such as in mobile communication systems, and in similar cases.

In order to achieve this object, the present invention is a radio communication system comprising a transmitting station which comprises a plurality of spreading means for spreading transmission data through a plurality of orthogonal codes, a plurality of modulation means for modulating spread signals that have been spread by the plurality of spreading means, and a plurality of transmission means for transmitting the modulated signals that have been modulated by the plurality of modulation means from a plurality of different transmission antennas in the form of a plurality of radio signals, and a receiving station which comprises reception means for receiving, through a single receiving antenna, the plurality of radio signals that have been transmitted by the plurality of transmission means, a plurality of reverse spreading means for reverse spread and output, through the plurality of orthogonal codes, of the plurality of radio signals received by the reception means, selection means for selecting, on the basis of detection level, one of the plurality of reverse spread outputs that are output from the reverse spreading means, and deciding means for deciding on one of the reverse spread outputs selected by the selection means.

The plurality of modulation means modulate, at a given carrier frequency, the spread signals that have been spread by the plurality of spreading means.

At this time, the plurality of transmitting antennas are a plurality of antennas positioned in differing spatial locations relative to each other.

Alternatively, the plurality of modulation means modulate, at different carrier frequencies, the spread signals that have been spread by the plurality of spreading means.

Here, the orthogonal codes are characterized by being Walsh functions.

Here, the radio communication system comprises a base station having the transmission station and, a plurality of mobile stations each having the receiving station and being linked with the base station via a radio link, and the transmission data is control data transmitted from the base station to the plurality of mobile stations.

Here, the radio signals are transmitted by time division duplex.

Further, a radio communication system comprising a transmitting station which comprises a plurality of spreading means for spreading transmission data by a plurality of orthogonal codes, a plurality of modulation means for modulating the spread signals that have been spread by the plurality of spreading means, and a plurality of transmission means for transmitting the modulated signals that have been modulated by the plurality of modulation means from a plurality of different transmission antennas in the form of a plurality of radio signals, and a receiving station which comprises reception means for receiving, through a single receiving antenna, the plurality of radio signals that have been transmitted by the plurality of transmission means, a plurality of reverse spreading means for reverse spread and output, through the plurality of orthogonal codes, of the plurality of radio signals received by the reception means, adding means for adding the plurality of reverse spread outputs output from the reverse spreading means, and deciding means for deciding the reverse spread output added by the adding means.

Alternatively, here, the adding means is provided with weighting means for multiplying the plurality of reverse spread outputs output from the reverse spreading means by weight factors in accordance with the individual reverse spread output levels, prior to the addition process. By means of this design, transmission diversity is possible even where there is yet no information regarding the location, direction, etc., of the partner station, or when the base station is to transmit data directed to all of a plurality of mobile stations.

DESCRIPTION OF THE PREFERRED EMBODIMENTS

Figure 1:
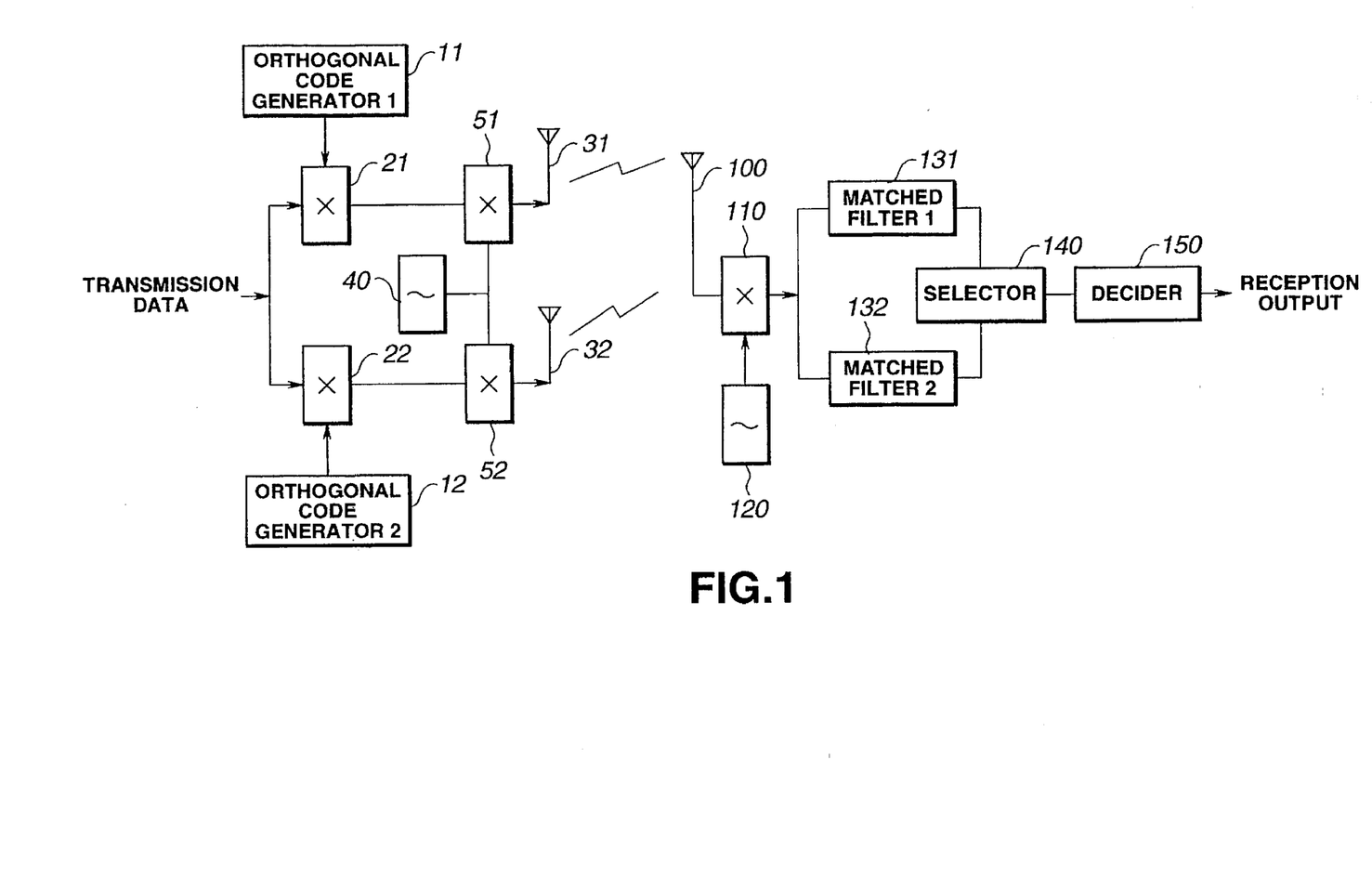
FIG. 1 is a block diagram depicting the design of a radio communication system pertaining to an embodiment of the present invention.

FIG. 1 is a block diagram depicting a design of the transmitting station in one embodiment of the radio communication system which pertains to the present invention.

In this embodiment, the number of orthogonal codes and the number of transmitting antennas (N) is 2. In FIG. 1, on the transmitting side, 11 and 12 indicate orthogonal code generators, 21 and 22 indicate spreaders, 31 and 32 indicate transmitting antennas, 40 indicates an oscillator, and 51 and 52 indicate BPSK (binary phase shift keying) modulators. On the receiving side, 100 indicates a receiving antenna, 110 indicates a coherent detector, 120 indicates a carrier wave reproduction circuit, 131 and 132 indicate matched filters, 140 indicates a selector, and 150 indicates a decider.

On the transmitting side, transmission data is spread by the spreaders 21 and 22 by means of the two orthogonal codes generated by the orthogonal code generators 11 and 12. After spread, the two signals are subjected to binary phase shift modulation by the BPSK modulators 51 and 52, and are then transmitted from the antennas 31 and 32. The two BPSK modulators 51 and 52 are provided with a given carrier frequency generated by the oscillator 40.

Here, the transmitting antennas 31 and 32 differ from each other in spatial location, producing a space diversity effect.

Figure 2:
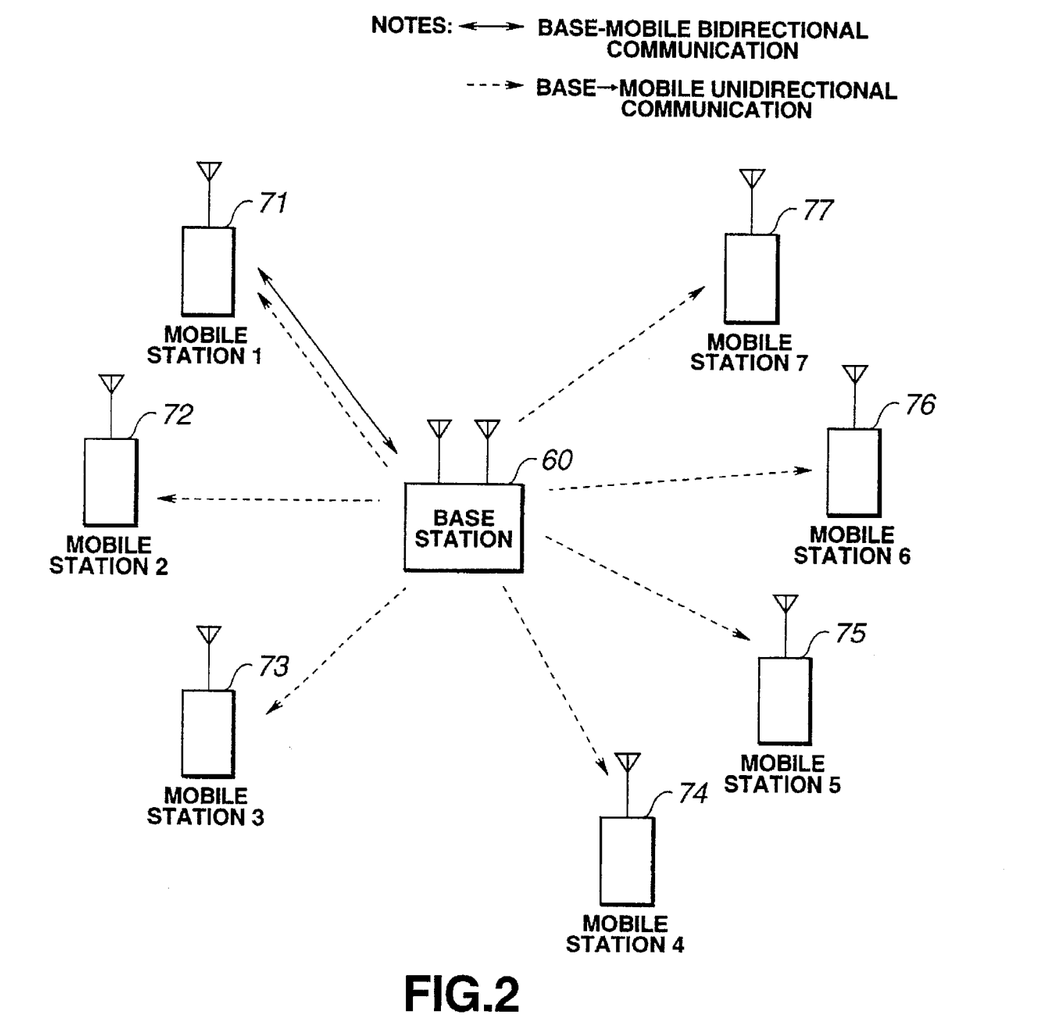
FIG. 2 is a conceptual diagram depicting a communication system in which the present invention is implemented.

FIG. 2 depicts a communication system in which the present invention is implemented. As depicted in FIG. 2, in a communication system comprising a single base station 60 and a plurality of mobile stations 71–77, after bidirectional communication has been established between the base station 60 and a mobile station 71 (as indicated by the solid line in FIG. 2), or where data is to be transmitted from the mobile stations 71–77 to the base station 60, or in similar cases, transmitting antenna control from the base station 60 directed to the mobile station 71 is possible on the basis of reception diversity signals received when communication from the mobile stations 71–77 directed to the base station 60 has been received by the base station 60.

For communications other than those mentioned above, communication from the base station 60 to all of the mobile stations 71–77 (indicated by the dotted lines in FIG. 2) is necessary in many cases.

Examples are calls to mobile stations, or cases where system parameters indicating base station ID, location, and the like are to be broadcast. In such cases, reception diversity control signals when communications directed to the base station 60 from the mobile stations 71–77 are received by the base station 60 cannot be used in transmitting antenna control from the base station 60 directed to the mobile station 71.

An object of the present invention is to make possible transmission diversity, even in the case of initial transmission, where there is yet no information regarding the location, direction, etc., of the partner station, or where the base station is to communicate with all of a plurality of mobile stations, such as in mobile communication systems, and in similar cases.

Figure 3:
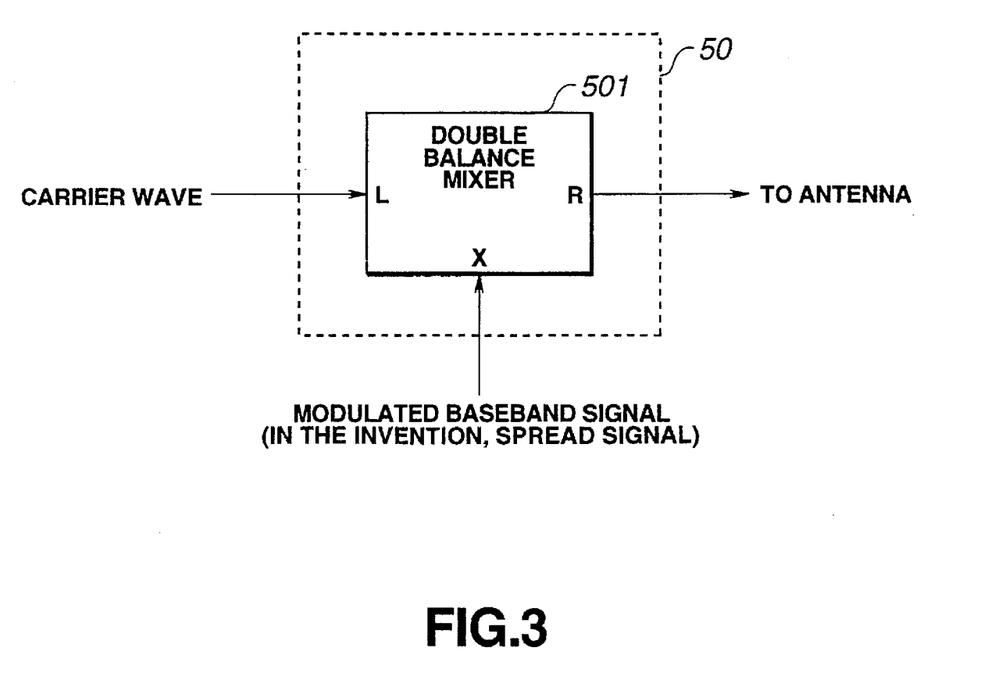
FIG. 3 is a block diagram depicting the BPSK modulators used in the transmitting station depicted in FIG. 1.

FIG. 3 depicts in detail the BPSK modulators 51 and 52 depicted in FIG. 1. The circuit is realized using a commercially available double-balanced mixer element 501, through execution of the product of the modulated baseband signal and the carrier wave.

FIG. 4 depicts aspects of spread performed in this embodiment. In FIG. 4, the horizontal axis indicates time and the numerals indicate the logical state of the signals.

Figure 4A:
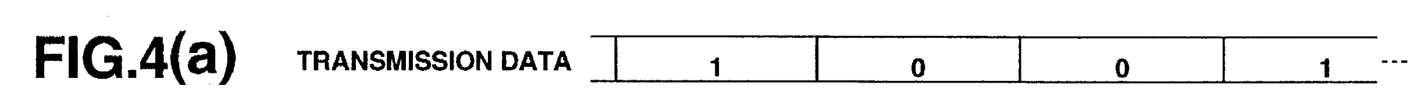
FIGS. 4(a)–4(e) is an explanatory diagram depicting the spread performed in the embodiment depicted in FIG. 1.
Figure 4B:
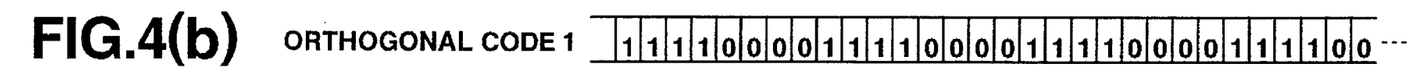
Figure 4C:
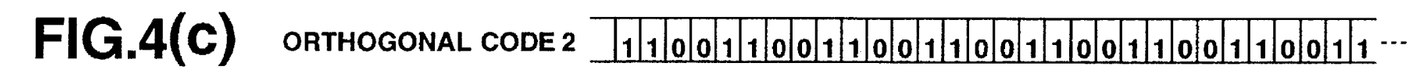
Figure 4D:
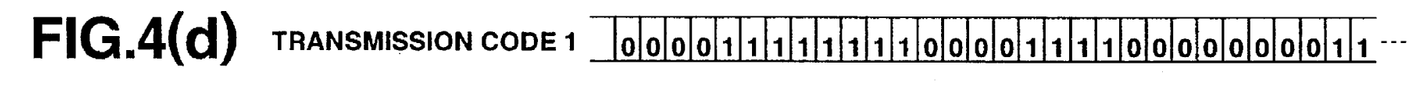
Figure 4E:
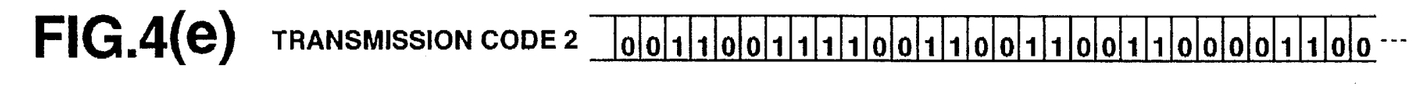

In FIG. 4, the 3-bit transmission data (1,0,0) depicted in FIG. 4(a) is spread by the spread signal 1 depicted in FIG. 4(b) and the spread signal 2 depicted in FIG. 4(c) (with clock speeds eight times the transmission data), and the 24-bit transmission code 1 depicted in FIG. 4(d) and the transmission code 2 depicted in FIG. 4(e) are generated and transmitted.

This spread method is termed spread spectrum or code division multiple access (CDMA), and involves modulated transmission after the independent spread signals for each communication channel have been multiplied by the original data signals, in order to realize multiplex communication on the same modulation frequency at the same time.

The spread signal 1 depicted in FIG. 4(b) and the spread signal 2 depicted in FIG. 4(c) are orthogonal to each other; the use of a suitable matched filter and correlator on the receiving side allows the data to be separated and reproduced independently.

The spread signal 1 depicted in FIG. 4(b) and the spread signal 2 depicted in FIG. 4(c) are examples of Walsh functions.

The transmission code depicted in FIG. 4(d) and the transmission code depicted in FIG. 4(e) are computed as the logical product of the transmission data depicted in FIG. 4(a) and the spread signal 1 depicted in FIG. 4(b) or the spread signal 2 depicted in FIG. 4(c) at a given point in time; these computations may be accomplished easily in practice using an EX-OR (exclusive-OR) element.

On the receiving side, signals from the transmitting station that have been received by the receiving antenna 100 are detected by the coherent detector 110 through the reproduced carrier wave from the carrier wave reproduction circuit 120, and the baseband signals obtained as a result are passed through the matched filters 131 and 132, which correspond to the spread signal 1 and the spread signal 2 on the transmitting side, and are subjected to reverse spread.

The output with the higher peak level or higher average level is selected from the outputs of the matched filters 131 and 132, a decision is made by the decider 150, and the received digital data is reproduced.

Figure 5:
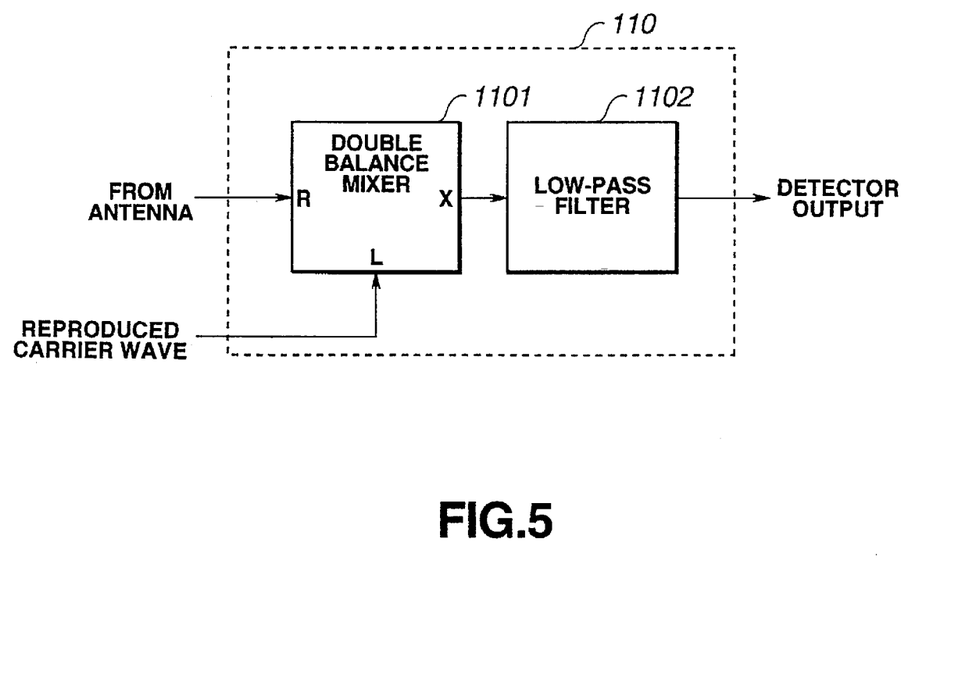
FIG. 5 is a block diagram depicting a coherent detector for BPSK used in the receiving station depicted in FIG. 1.

FIG. 5 depicts a specific design for a coherent detector for BPSK 110 used in the receiving station depicted in FIG. 1. A commercially available double-balanced mixer element 1101 and a low-pass filter 1102 are used in these circuits. A delay detector, described later, can be used in place of the coherent detector 110.

Figures 6A, 6B:
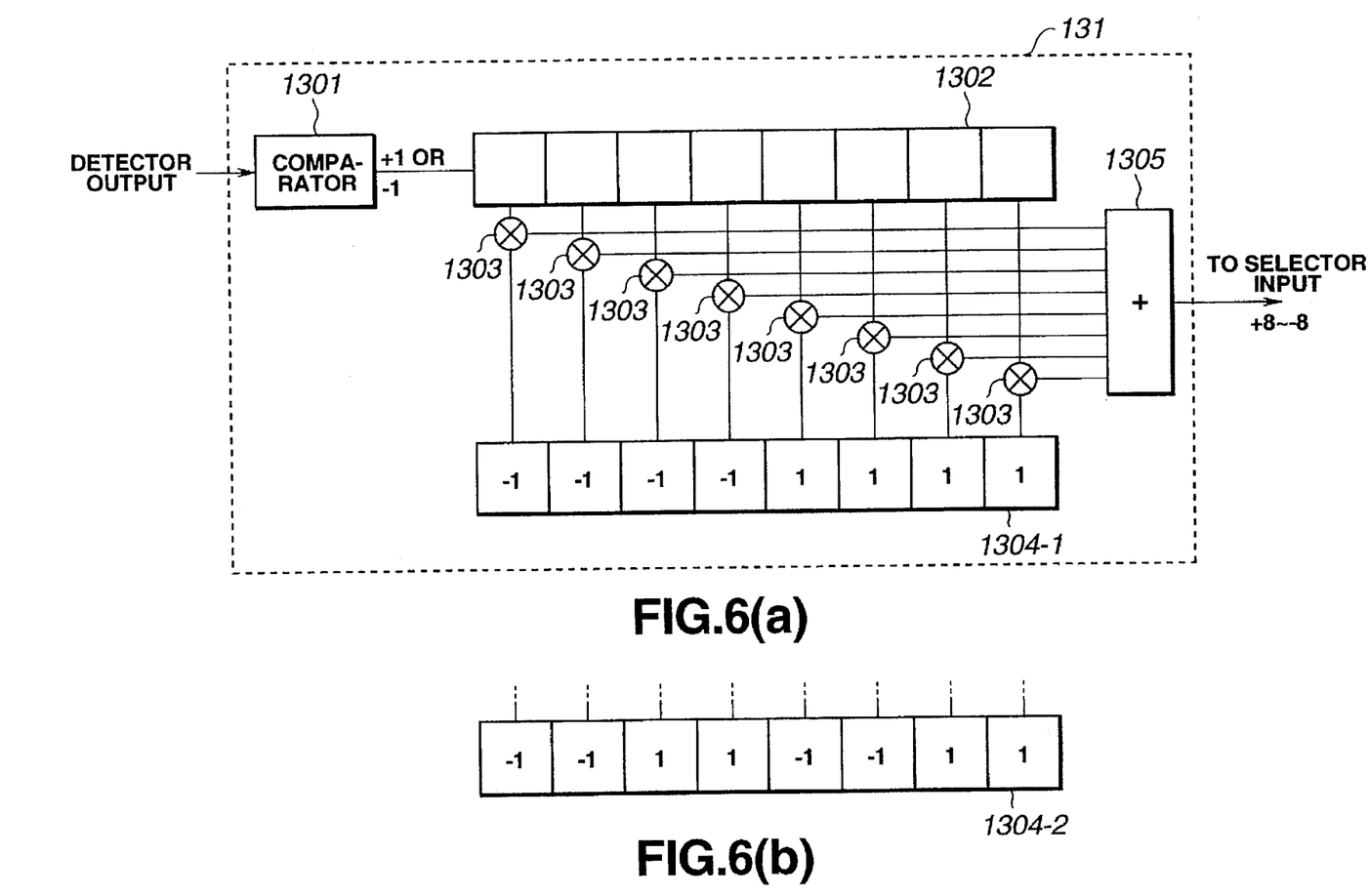
FIGS. 6(a) and 6(b) are block diagrams depicting the matched filters used in the receiving station depicted in FIG. 1.

FIGS. 6(a) and 6(b) depict specific designs for the matched filters 131 and 132. In the figure, 1301 indicates a comparator, 1302 indicates an 8-stage shift register, 1303 indicates a multiplier, 1304 indicates an 8-bit memory, and 1305 indicates an adder. FIG. 6(a) illustrates the case of the matched filter 1 (131) which corresponds to the orthogonal code 1 depicted in FIG. 4(b); a value corresponding to the orthogonal code 1 is stored in the 8-bit memory 1304-1 as +1 (true) and −1 (false). In the case of the matched filter 2 (132) which corresponds to the orthogonal code 2 depicted in FIG. 4(c), only the contents of the 8-bit memory 1304-2 are shown in FIG. 6(b). Other parts of the matched filter 2 are the same as those of the matched filter 1 (131).

To describe briefly the operation of this circuit, the output of the detector is passed through the comparator 1301 and is Converted into a code expressed in +1 (true) and −1 (false), and stored in order in the 8-stage shift register 1302. An orthogonal code expressed in +1 (true) and −1 (false) is stored in the memory 1304, each bit in the shift register 1302 and each bit in the memory 1304 is multiplied by the multiplier 1303, and the total is added by the adder 1305. Therefore, if each bit in the shift register 1302 and each bit in the memory 1304 completely match, the adder 1305 has a value of +8, and if totally opposite, the adder 1305 has a value of −8, so that if the codes are orthogonal, the output is zero. By determining whether the output is positive or negative, it is possible to reproduce the received digital data.

Figure 7:
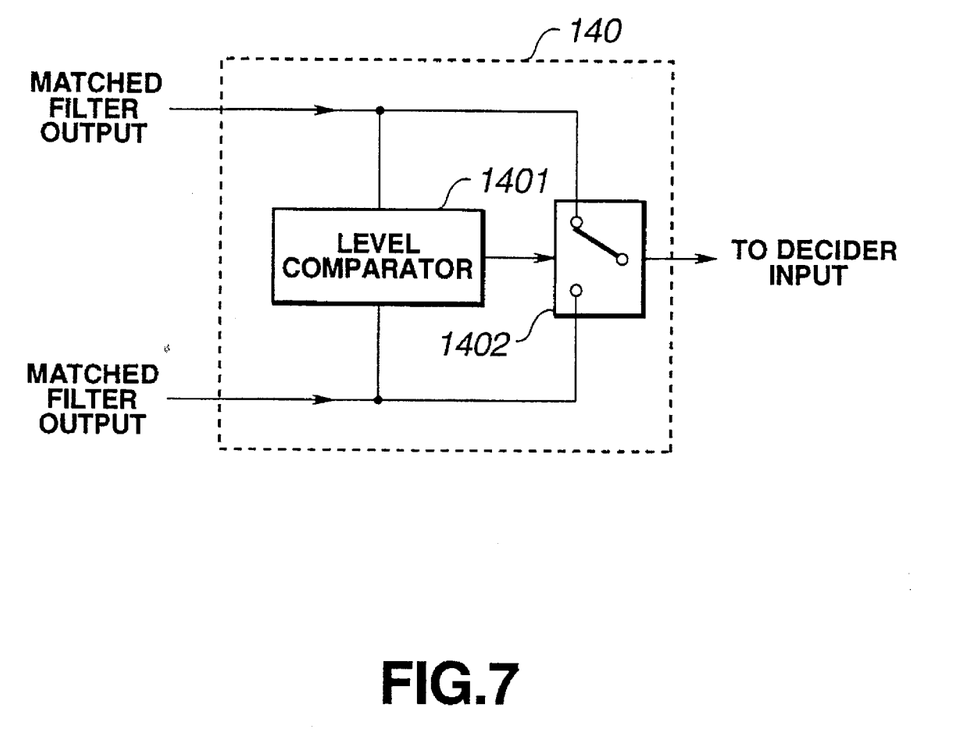
FIG. 7 is a block diagram depicting the selector used in the receiving station depicted in FIG. 1.

FIG. 7 depicts the structure of the selector 140. The magnitude of the output levels of the matched filters 131 and 132 are compared by a comparator 1401, and a switching circuit 1402 is controlled such that the greater one is selected.

Figure 8:
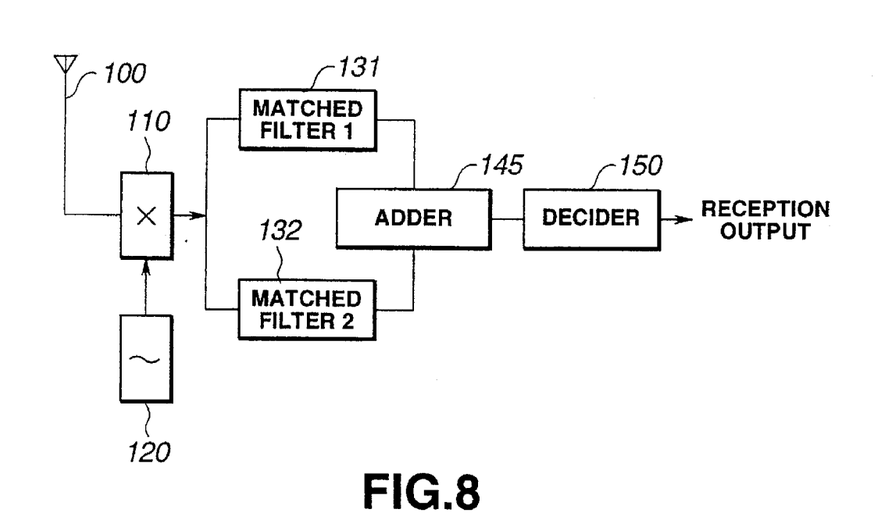
FIG. 8 is a block diagram depicting another design of the receiving station in a radio communication system pertaining to an embodiment of the present invention.

FIG. 8 is a block diagram depicting the design of a receiving station in another embodiment of the radio communication system pertaining to the present invention. It receives signals from the transmitting station in place of the receiving station of the radio communication system depicted in FIG. 1.

In FIG. 8, 100 indicates a receiving antenna, 110 indicates a coherent detector, 120 indicates a carrier wave reproduction circuit, 131 and 132 indicate matched filters, 145 indicates an adder, and 150 indicates a decider; all circuits are the same as those depicted in FIG. 1, with the exception of the adder 145.

Signals from the transmitting station that have been received by the receiving antenna 100 are detected at the coherent detector 110 through the reproduced carrier wave from the carrier wave reproduction circuit 120, and the baseband signals obtained as a result are passed through the matched filters 131 and 132, which correspond to the spread signal 1 and the spread signal 2 on the transmitting side, and are subjected to reverse spread. The outputs of the matched filters 131 and 132 are subjected to addition by the adder 145, a decision is made by the decider 150, and the received digital data is reproduced.

With the receiving station design depicted in FIG. 8, the outputs of the two matched filters 131 and 132 are subjected to addition for output, rather than selecting the output of one of the filters. This design serves to minimize the effects of noise, such as momentary interruptions, to the extent that addition is performed.

Figure 9:
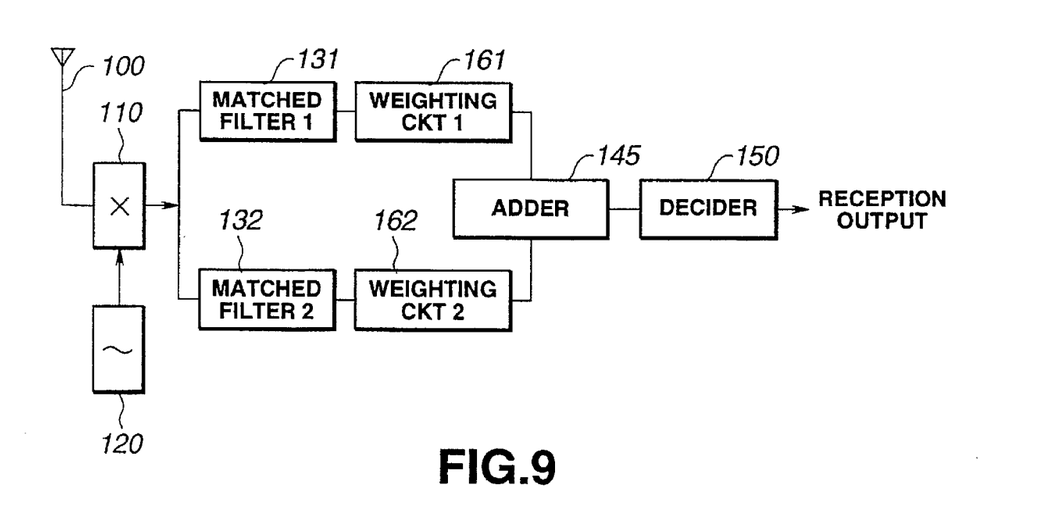
FIG. 9 is a block diagram depicting another design of the receiving station in a radio communication system pertaining to an embodiment of the present invention.

FIG. 9 is a block diagram depicting the design of a receiving station in another embodiment of a radio communication system pertaining to the present invention. It receives signals transmitted from the transmitting station in place of the receiving station of the radio communication system depicted in FIG. 1.

In FIG. 9, 100 indicates a receiving antenna, 110 indicates a coherent detector, 120 indicates a carrier wave reproduction circuit, 131 and 132 indicate matched filters, 145 indicates an adder, 150 indicates a decider, and 161 and 162 indicate weighting circuits. All circuits are the same as those depicted in FIG. 8, with the exception of the weighting circuits 161 and 162.

Signals from the transmitting station that have been received by the receiving antenna 100 are detected at the coherent detector 110 through the reproduced carrier wave from the carrier wave reproduction circuit 120, and the baseband signals obtained as a result are passed through the matched filters 131 and 132, which correspond to the spread signal 1 and the spread signal 2 on the transmitting side, and are subjected to reverse spread. The outputs of the matched filters 131 and 132 are weighted in accordance with reception level by the weighting circuits 161 and 162, subjected to addition by the adder 145, a decision is made by the decider 150, and the received digital data is reproduced.

With the receiving station design depicted in FIG. 9, prior to addition, the outputs of the matched filters 131 and 132 are weighted in accordance with their reception level by the weighting circuits 161 and 162, which place greater weight on higher reception levels, and addition is then performed by the adder 145. This weighting process increases the relative weight placed on higher reception levels, further enhancing resistance to noise.

In the foregoing embodiments, a case in which the number of orthogonal codes and the number of transmission antennas (N) were 2 was described, but N can be any number equal to 2 or greater. Superior diversity effects are achieved with greater numbers.

Also, in the foregoing embodiments, a space diversity effect was achieved through differences in the spatial locations of the plurality of antennas. However, similar diversity effects can be achieved by varying the directionality of the plurality of antennas, by changing the frequency used, or by using a plurality of signals with varying wave propagation characteristics.

Figure 10:
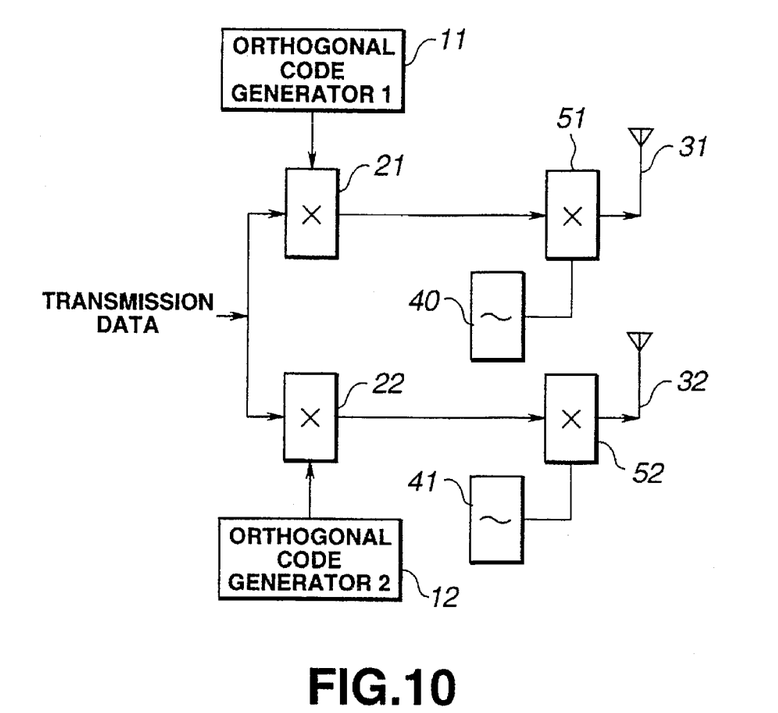
FIG. 10 is a block diagram depicting another design of the transmitting station in a radio communication system pertaining to an embodiment of the present invention.
Figure 11:
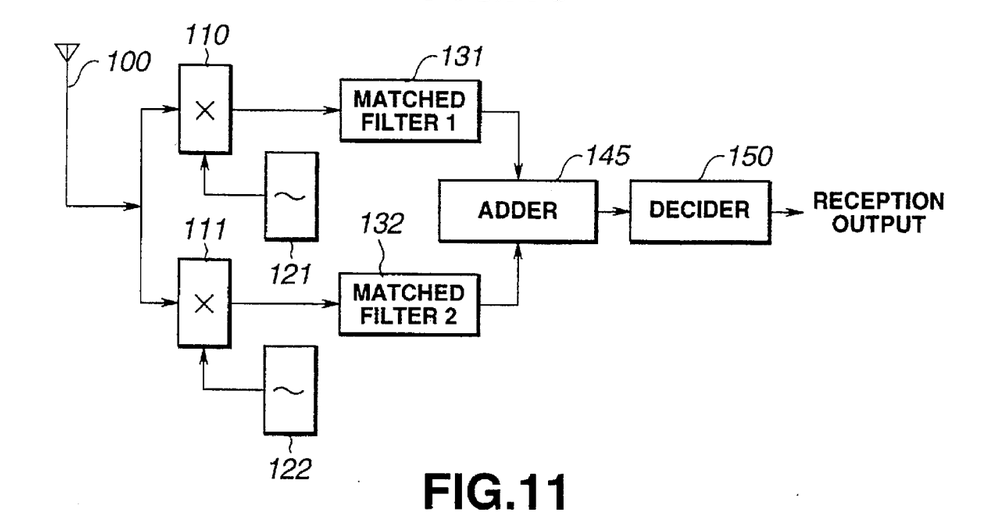
FIG. 11 is a block diagram depicting the design of a receiving station for the embodiment depicted in FIG. 10.

A block diagram of a transmitting station design in which the number of N is 2 and the frequency has been changed is shown in FIG. 10, and a block diagram of the design of a corresponding receiving station is shown in FIG. 11.

In FIGS. 10, 11 and 12 indicate orthogonal code generators, 21 and 22 indicate spreaders, 31 and 32 indicate transmitting antennas, 40 and 41 indicate oscillators, and 51 and 52 indicate BPSK (binary phase shift keying) modulators.

Transmission data is spread by the spreaders 21 and 22 by means of the two orthogonal codes generated by the orthogonal code generators 11 and 12. After spread, the two signals are subjected to binary phase shift modulation by the BPSK modulators 51 and 52, and are then transmitted from the antennas 31 and 32. The two BPSK modulators 51 and 52 are provided with carrier waves generated by the oscillators 40 and 41.

Here, the oscillators 40 and 41 are oscillators with different frequencies. The transmission data that has been spread by the spreaders 21 and 22 by means of two orthogonal codes generated by the orthogonal code generators 11 and 12 is subjected to binary phase shift modulation by the BPSK modulators 51 and 52 with the carrier waves of different frequencies provided by the oscillators 40 and 41, and are transmitted from the antennas 31 and 32.

In FIG. 11, 100 indicates a receiving antenna, 110 and 111 indicate coherent detectors, 120 indicates a carrier wave reproduction circuit, 131 and 132 indicate matched filters, 145 indicates an adder, and 150 indicates a decider. 121 and 122 are carrier wave reproduction circuits for reproducing the frequencies of the oscillators 40 and 41 depicted in FIG. 10; the other circuits are the same as those depicted in FIG. 8.

Signals from the transmitting station that have been received by the receiving antenna 100 are detected at the coherent detectors 110 and 111 through the reproduced carrier waves from the carrier wave reproduction circuits 121 and 122, and the baseband signals obtained as a result are passed through the matched filters 131 and 132, which correspond t0 the spread signal 1 and the spread signal 2 on the transmitting side, and are subjected to reverse spread. The outputs of the matched filters 131 and 132 are subjected to addition by the adder 145, a decision is made by the decider 150, and the received digital data is reproduced.

In the foregoing embodiment, reverse spread is performed by the matched filters, but a combination of reference pattern generators and correlators could be used in place of the matched filters.

Figure 12:
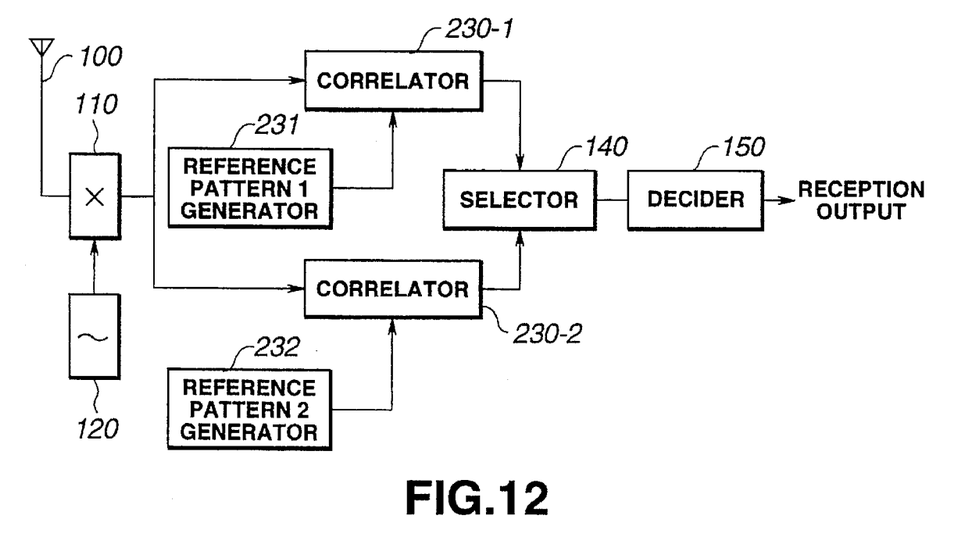
FIG. 12 is a block diagram depicting another design of the receiving station in a radio communication system pertaining to an embodiment of the present invention.

In FIG. 12, the design of a receiving station which uses correlators 230-1 and 230-2 in place of the matched filters 131 and 132 depicted in FIG. 1 is depicted. Reverse spread is carried out using a combination of the correlators 230-1 and 230-2, a reference pattern 1 generator 231, which corresponds to the orthogonal code generator 11, and a reference pattern 2 generator 232, which corresponds to the orthogonal code generator 12.

Signals from the transmitting station that have been received by the receiving antenna 100 are detected at the coherent detector 110 through the reproduced carrier wave from the carrier wave reproduction circuit 120, and the baseband signals obtained as a result are passed through the correlators 230-1 and 230-2 which correspond respectively to the spread signal 1 and the spread signal 2 on the transmitting side, and are subjected to reverse spread.

From the outputs of the correlators 230-1 and 230-2, the output with the higher peak level or average level is selected at the selector 140, a decision is made by the decider 150, and the received digital data is reproduced.

Figure 13:
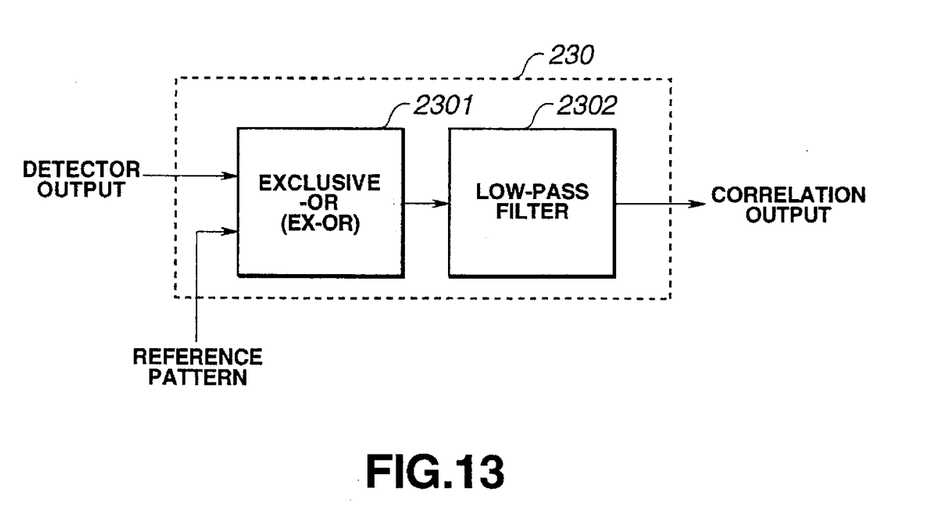
FIG. 13 is a block diagram depicting the correlator used in the receiving station depicted in FIG. 12.

FIG. 13 is an example of a specific circuit design of the correlator 230 used in FIG. 12. The product of the received signal and the reference pattern is executed time-sequentially by the EX-OR (exclusive-OR) circuit 2301, and the result of the product of the received signal and the reference pattern is smoothed by the low-pass filter 2302. The design of the correlator 230 can be viewed as one in which the multipliers 1303 of the matched filters 131 and 132 depicted in FIG. 6 are replaced with one EX-OR (exclusive-OR) circuit 2301 so that the product will be smoothed time-sequentially.

Figure 14:
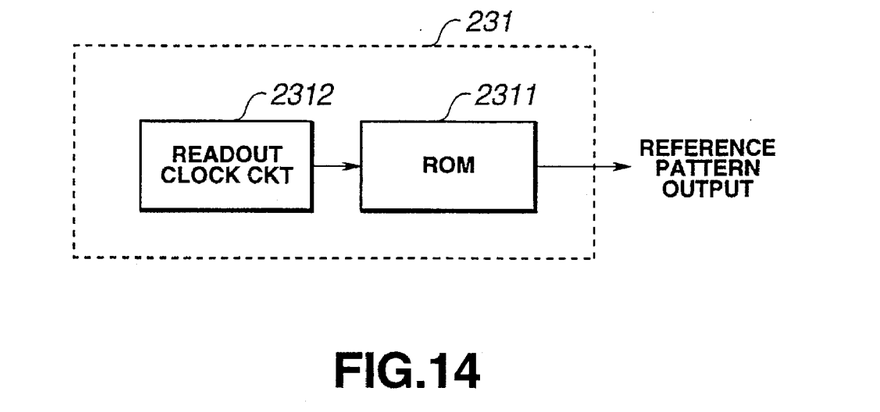
FIG. 14 is a block diagram depicting the reference pattern generator used in the receiving station depicted in FIG. 12.

FIG. 14 is an example of a specific circuit design of the reference pattern generator used by the correlator 230. It comprises a ROM 2311 which stores the reference pattern and a readout clock circuit 2312.

Figure 15:
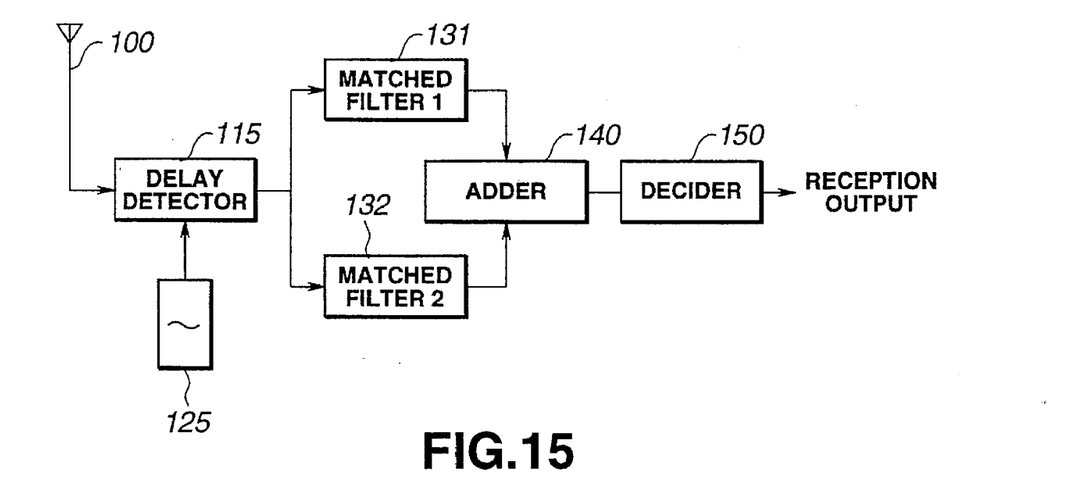
FIG. 15 is a block diagram depicting another design of the receiving station in an embodiment of the present invention.

FIG. 15 depicts the design of the receiving station of FIG. 8, and is a circuit block diagram which depicts the case when a delay detector 115 is used in place of the coherent detector 110. Signals from the transmitting station that have been received by the receiving antenna 100 are detected by the delay detector 115 through the local oscillation carrier wave from the local oscillator 125. Subsequent operations are the same as in the case of FIG. 8.

Figure 16:
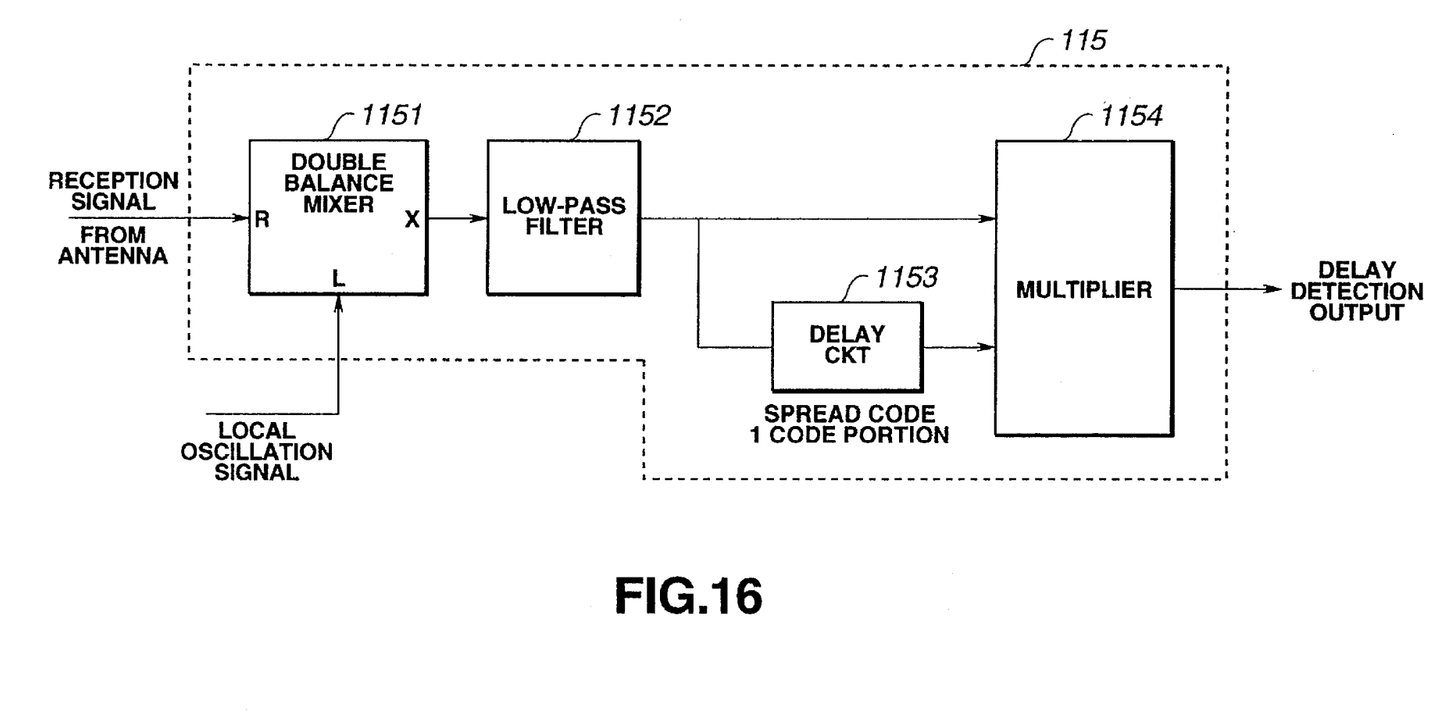
FIG. 16 is a block diagram of a delay detector for BPSK used in the receiving station depicted in FIG. 15.

FIG. 16 depicts a specific design of the BPSK delay detector 115. In this circuit, received signals from the antenna are mixed with local oscillation signals by the double-balance mixer element 1151, and the low-band waves are taken out by the low-pass filter 1152; and are multiplied at the multiplier 1154 with the signal itself which has passed through the delay circuit 1153 for one code portion of the spread code, to form a delay detection output.

The use of the delay detector 115 in place of the coherent detector 110 has the advantage that phase control of the local oscillator 125 becomes unnecessary, and that the frequency precision need not be so stringent. Depending on the usage condition, either one of the detectors is used.

With the present invention described above, the transmission data is spread at the transmitting side, the spread data is transmitted as a plurality of radio signals with different propagation conditions, the plurality of radio signals are received and subjected to reverse spread at the receiving side, and the transmission data is reproduced from one of these signals or an added signal of the plurality of signals. This makes transmission diversity possible even in the case of radio communication directed from a base station to mobile stations, and allows the required transmission power to be reduced.

Since the foregoing design permits the transmission power to be reduced, the device can be made smaller, cost reduction is possible, and interference with other communication systems can be minimized.

In addition, transmission of initial communication calls, notification of system parameters, and other control data from a base station to mobile stations can be conducted accurately and reliably without fading-induced errors.

What is claimed is:

1. A radio communication system comprising:
 a transmitting station which comprises:
  a plurality of orthogonal code generating means for generating a plurality of orthogonal codes which are different from each other;
  a plurality of spreading means for spreading transmission data through the plurality of orthogonal codes;
  a plurality of modulation means for modulating spread signals that have been spread by the plurality of spreading means; and
  a plurality of transmission means for transmitting the modulated signals that have been modulated by the plurality of modulation means from a plurality of different transmission antennas in the form of a plurality of radio signals, and
 a receiving station which comprises:
  reception means for receiving, through a single receiving antenna, the plurality of radio signals that have been transmitted by the plurality of transmission means;
  a plurality of reverse spreading means for reverse spread and output, through the plurality of orthogonal codes, of the plurality of radio signals received by the reception means;
  selection means for selecting, on the basis of a detection level, one of the plurality of reverse spread outputs that are output from the reverse spreading means; and
  deciding means for reproducing received data corresponding to the transmission data from one of the reverse spread outputs selected by the selection means.

2. A radio communication system as defined in claim 1, wherein the plurality of modulation means modulate, at a given carrier frequency, the spread signals that have been spread by the plurality of spreading means.

3. A radio communication system as defined in claim 2, wherein the plurality of transmitting antennas are a plurality of antennas positioned in differing spatial locations relative to each other.

4. A radio communication system as defined in claim 1, wherein the plurality of modulation means modulate, at different carrier frequencies, the spread signals that have been spread by the plurality of spreading means.

5. A radio communication system as defined in claim 1, wherein the orthogonal codes are Walsh functions.

6. A radio communication system as defined in claim 1, wherein the radio communication system comprises:
 a base station having the transmitting station; and
 a plurality of mobile stations each having the receiving station and being linked with the base station via a radio link, and
 wherein the transmission data comprises:
  control data transmitted from the base station to the plurality of mobile stations.

7. A radio communication system as defined in claim 1, wherein the radio signals are transmitted by time division duplex.

8. A radio communication system as defined in claim 1, wherein the reverse spreading means comprises matched filters corresponding to the orthogonal codes.

9. A radio communication system as defined in claim 1, wherein the reverse spreading means comprises correlation means corresponding to the orthogonal codes.

10. A radio communication system comprising:
 a transmitting station which comprises:
  a plurality of orthogonal code generating means for generating a plurality of orthogonal codes which are different from each other;
  a plurality of spreading means for spreading transmission data through the plurality of orthogonal codes;
  a plurality of modulation means for modulating spread signals that have been spread by the plurality of spreading means; and
  a plurality of transmission means for transmitting the modulated signals that have been modulated by the plurality of modulation means from a plurality of different transmission antennas in the form of a plurality of radio signals, and
 a receiving station which comprises:
  reception means for receiving, through a single receiving antenna, the plurality of radio signals that have been transmitted by the plurality of transmission means;
  a plurality of reverse spreading means for reverse spread and output, through the plurality of orthogonal codes, of the plurality of radio signals received by the reception means;
  adding means for adding the plurality of reverse spread outputs output from the reverse spreading means; and
  deciding means for reproducing received data corresponding to the transmission data from the reverse spread outputs added by the adding means.

11. A radio communication system as defined in claim 10, wherein the adding means comprises weighting means for multiplying the plurality of reverse spread outputs from the reverse spreading means by weight factors in accordance with the individual reverse spread output levels, prior to the addition process.

12. A radio communication system as defined in claim 10, wherein the plurality of modulation means modulate, at a given carrier frequency, the spread signals that have been spread by the plurality of spreading means.

13. A radio communication system as defined in claim 12, wherein the plurality of transmitting antennas are a plurality of antennas positioned in differing spatial locations relative to each other.

14. A radio communication system as defined in claim 10, wherein the plurality of modulation means modulate, at different carrier frequencies, the spread signals that have been spread by the plurality of spreading means.

15. A radio communication system as defined in claim 10, wherein the orthogonal codes are Walsh functions.

16. A radio communication system as defined in claim 10, wherein the radio communication system comprises:
 a base station having the transmitting station; and
 a plurality of mobile stations each having the receiving station and being linked with the base station via a radio link, and
 wherein the transmission data comprises:
  control data transmitted from the base station to the plurality of mobile stations.

17. A radio communication system as defined in claim 10, wherein the radio signals are transmitted by time division duplex.

* * * * *